(12) United States Patent  (10) Patent No.: US 8,665,483 B2
Dominguez Pastor et al.  (45) Date of Patent: Mar. 4, 2014

(54) RESTRICTING PRINTING (75) Inventors: Pablo Dominguez Pastor, Barcelona (ES); Sebastia Cortes i Hermes, Barcelona (ES); Angel Martinez, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 628 days.

(21) Appl. No.: 12/619,330

(22) Filed: Nov. 16, 2009

(65) Prior Publication Data

US 2011/0116109 A1  May 19, 2011

(51) Int. Cl.
  *G06K 15/00*  (2006.01)
  *G06F 3/12*  (2006.01)
  *G03G 15/00*  (2006.01)
(52) U.S. Cl.
  USPC ....... 358/1.16; 358/1.14; 358/1.15; 358/1.17; 399/23; 399/81; 399/82
(58) Field of Classification Search
  None
  See application file for complete search history.

(56) References Cited

U.S. PATENT DOCUMENTS

| 5,124,750 | A | | 6/1992 | Naito | |
| 5,946,527 | A | * | 8/1999 | Salgado et al. | 399/82 |
| 6,141,028 | A | | 10/2000 | Aruga | |
| 6,557,965 | B2 | | 5/2003 | Walker et al. | |
| 6,827,418 | B2 | | 12/2004 | Otokita | |
| 7,018,008 | B2 | | 3/2006 | Tsujimoto | |
| 8,200,142 | B2 | * | 6/2012 | Vetromile et al. | 399/382 |
| 2003/0231359 | A1 | * | 12/2003 | Hayashi et al. | 358/498 |
| 2004/0141203 | A1 | * | 7/2004 | Honma | 358/1.15 |
| 2005/0007618 | A1 | * | 1/2005 | Thomason | 358/1.14 |
| 2005/0031392 | A1 | | 2/2005 | Yamamoto et al. | |
| 2005/0088679 | A1 | * | 4/2005 | Martin et al. | 358/1.14 |
| 2006/0282772 | A1 | | 12/2006 | Chamberlin et al. | |
| 2007/0201926 | A1 | * | 8/2007 | Kato | 400/62 |
| 2010/0003038 | A1 | * | 1/2010 | Jo | 399/23 |
| 2010/0097630 | A1 | * | 4/2010 | Schwartz et al. | 358/1.15 |

* cited by examiner

*Primary Examiner* — Satwant Singh
(74) *Attorney, Agent, or Firm* — Garry A. Perry (57) ABSTRACT

In one embodiment, an option to restrict printing to a first print media source is presented to a user of a printer that is configured to access a plurality of print media sources. An instruction to restrict printing to the first print media source is received from the user. The printer is restricted from printing to the first print media source.

23 Claims, 7 Drawing Sheets

Roll Restriction

☐ Restrict Printing to Roll 1 – full restriction

☒ Restrict Printing to Roll 1 – partial restriction (no printing to Roll 1 unless user specifically designates Roll 1)

☐ Restrict Printing to Roll 2 – full restriction

☐ Restrict Printing to Roll 2 – partial restriction (no printing to Roll 2 unless user specifically designates Roll 2)

FIG. 7

RESTRICTING PRINTING

BACKGROUND

A large format printer in which more than one print media source is loaded and available for use is greatly valued in workgroup environments. Such a multi-source printer may allow multiple users to send print jobs to print on a variety of print media types with minimal changing of print media sources.

BRIEF DESCRIPTION OF THE DRAWINGS

The accompanying drawings illustrate various embodiments and are a part of the specification. The illustrated embodiments are merely examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

In a workgroup environment, multiple users using multiple computing devices may send print jobs to a shared printer. In a typical example, the shared printer may have inexpensive plain paper loaded onto a first roll or tray and more expensive print media (coated, heavy-weight coated or glossy) loaded onto additional rolls or trays. It is advantageous for a user to specify the correct print media source (and thereby the print media type) in the printer driver that the user sends a print job to the printer, so as to avoid unnecessarily printing to a more expensive print media and to avoid wasteful duplication.

It is common, however, for a user to forget to specify, or to choose not to specify, a print media source or a print media type when submitting a print job to a shared printer. In order to facilitate printing in these situations, a printer may be configured to print to a print media source in the absence of a user choice based on a chosen source-switching policy. In an example, a user may choose from among several source-switching policy options to set the source-switching policy to "minimize source changes", such that the printer will choose the print media source that is currently active to avoid wasting time with a source switch. In another example, a user may set the source-switching policy to a "minimize paper waste" setting, such that the print job prints to the narrowest source that meets the dimensional requirements of the print job and thereby minimize trimming. In another example, a user may set the source-switching policy to a "use the source with the least paper" setting.

It can be difficult for a user to remember the details of the source-switching policy options. And even if the user masters the details of the source-switching policy options, he or she may have difficulty keeping up with which policy is in place at the time of printing. The frequent result is that print jobs are sent to an incorrect print media source, wasting print media, consumables and time. The waste is compounded if the printer incorrectly accesses expensive print media. Embodiments described below were developed in an effort to restrict printing to a print media source. The embodiments shown in the accompanying drawings and described below are non-limiting examples. Other embodiments are possible and nothing in the accompanying drawings or in this Detailed Description of Embodiments should be construed to limit the scope of the disclosure, which is defined in the Claims.

The following description is broken into sections. The first, labeled "Environment," describes an exemplary environment in which embodiments may be implemented. The second section, labeled "Components" describes various physical and logical components utilized to implement various embodiments. The third section, labeled as "Operation", describes exemplary embodiments of a method to restrict printing to a print media source. The third section, labeled "Example," describes examples of user interfaces that may be implemented in various embodiments.

Environment

Figure 1:
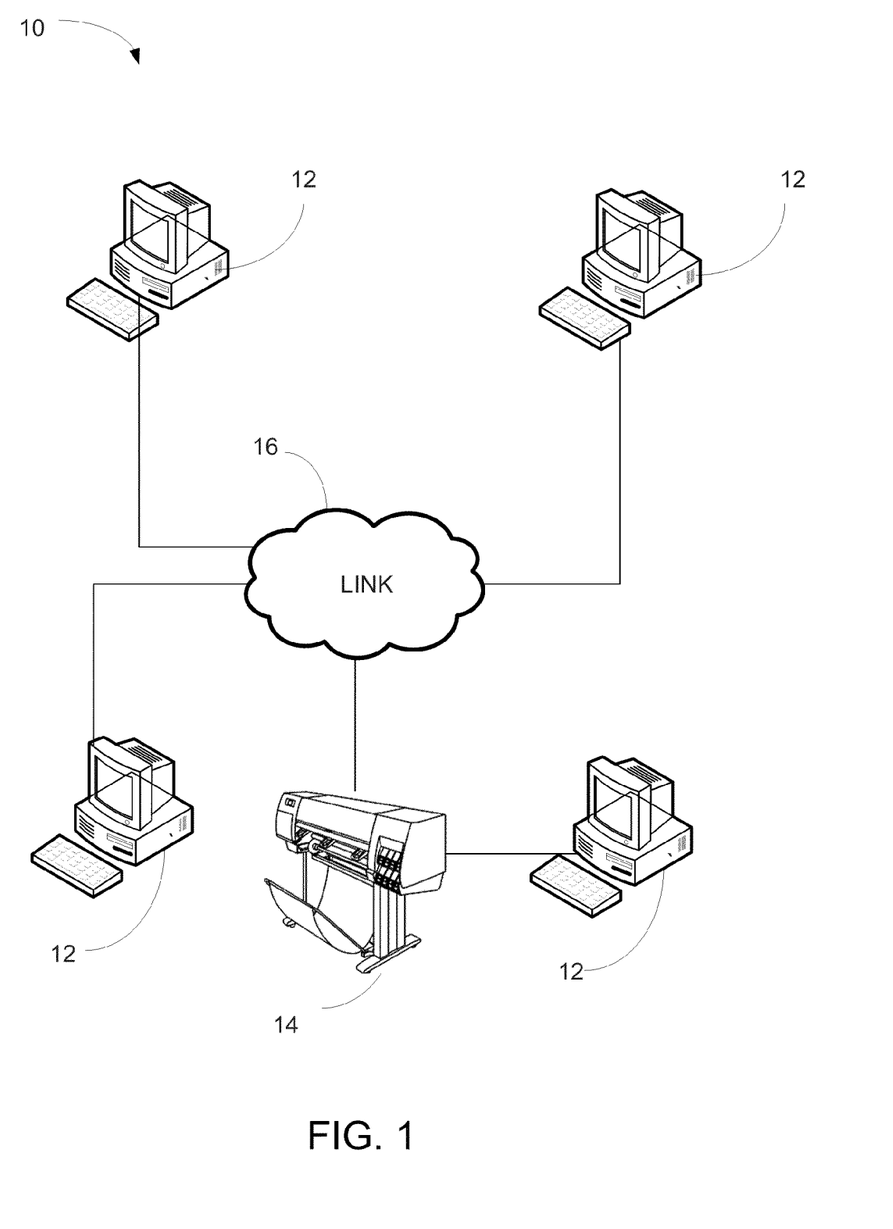
FIG. 1 depicts an exemplary environment in which embodiments may be implemented.

FIG. 1 depicts exemplary environment 10 in which embodiments may be implemented. Environment 10 includes computer workstations 12, and a printer 14 that is configured to access a plurality of print media sources. As used in this specification and the appended claims, a "print media source" includes any source or source of print media, including but not limited to a roll or stack of cut sheets of print media. In an example, a printer 14 that holds two rolls of print media may be said to access two print media sources. In another example, a printer 14 may have access to print media sources that are external to the printer 14.

The printer 14 may connect to workstations 12 via a link 16. The printer 14 may connect to other workstations 12 via a cable or wireless or other means without connecting the link 16. The workstations 12 represent generally any computing devices capable of sending a print job to the printer 14 via link 16 or directly without connecting to the link 16. In an embodiment, the printer 14 may receive print jobs and instructions from a workstation 12 via a printer driver that runs on the workstation 12.

Link 16 represents generally one or more of a cable, wireless, fiber optic, or remote connection via a telecommunication link, an infrared link, a radio frequency link, or any other connector or system that provides electronic communication. Link 16 may represent an intranet, the Internet, or a combination of both. The paths followed by link 16 between the workstations 12, and/or printer 14 as depicted in FIG. 1 represent the logical communication paths between these devices, not necessarily the physical paths between the devices.

Components

Figure 2:
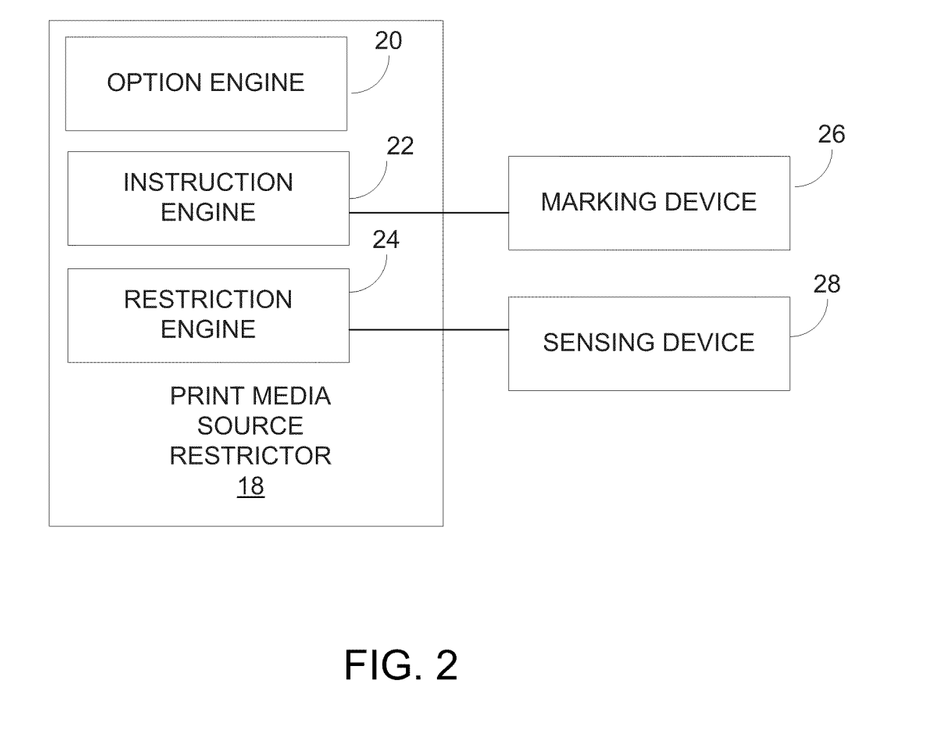
FIG. 2 depicts an exemplary print media source restrictor according to an embodiment.

FIG. 2 depicts an example of a print media source restrictor 18. Print media source restrictor 18 represents generally any combination of hardware and programming configured for use to restrict printing to a print media source. In the example of FIG. 2, print media source restrictor 18 is shown to include an option engine 20, an instruction engine 22, and a restriction engine 24.

Option engine 20 represents generally any combination of hardware and programming configured to present to a first user of a printer 14 that is configured to access a plurality of print media sources an option to restrict printing to a first print media source. In an embodiment, the option to restrict is an option to render the first print media source unavailable for printing. In an embodiment, the option to restrict is an option to render the first print media source unavailable for printing unless a user specifically designates the first print media source for printing. As used in this specification and the appended claims, "specifically" includes an affirmative selection of the media supply by a user (versus a default selection by a source-switching policy). As used in this specification, a "source-switching policy" includes a printer setting that selects which print media source to print to based on pre-defined conditions (rather than requiring the user that is sending the print job to make an affirmative selection). For example, a source-switching policy might cause a printer to print to a particular print media source based upon the dimensional requirements of the print job, or the amount of print media left in the source, or the last print media printed to. In an embodiment, the option engine 20 may present to the first user an option to unrestrict printing to the first print media source. As used in this specification and the appended claims, to "unrestrict" printing or a printer includes removing a restriction or restrictions. In an embodiment, the option engine 20 may present to the first user and a second user an option to unrestrict printing to the first print media source. In an embodiment, the option engine 20 may invite the first user or the second user to restrict or unrestrict printing to the first print media source during a loading or unloading operation.

Instruction engine 22 represents generally any combination of hardware and programming configured to receive from a first user a first instruction to restrict printing to the first print media source. In an embodiment, the instruction engine 22 may receive from the first user an instruction to unrestrict printing to the first print media source. In an embodiment, the instruction engine 22 may receive from the first user or a second user an instruction to unrestrict printing to the first print media source. In an embodiment the instruction engine 22 electronically connects to a marking device 26, and is operable to pass an instruction to restrict printing or an instruction to unrestrict printing on to the marking device 26.

Restriction engine 24 represents generally any combination of hardware and programming configured to restrict printing to the first print media source. In an embodiment, the restriction engine 24 causes the printer 14 to print to the first print media source if an instruction to print specifically designates the first print media source for printing. In an embodiment, the restriction engine 24 is operable to unrestrict the printer to make the first print media source available for printing. In an embodiment, the restriction engine 24 electronically connects to a sensing device 28 and is operable to receive an instruction to restrict or an instruction to unrestrict printing from the sensing device 28.

Figure 3:
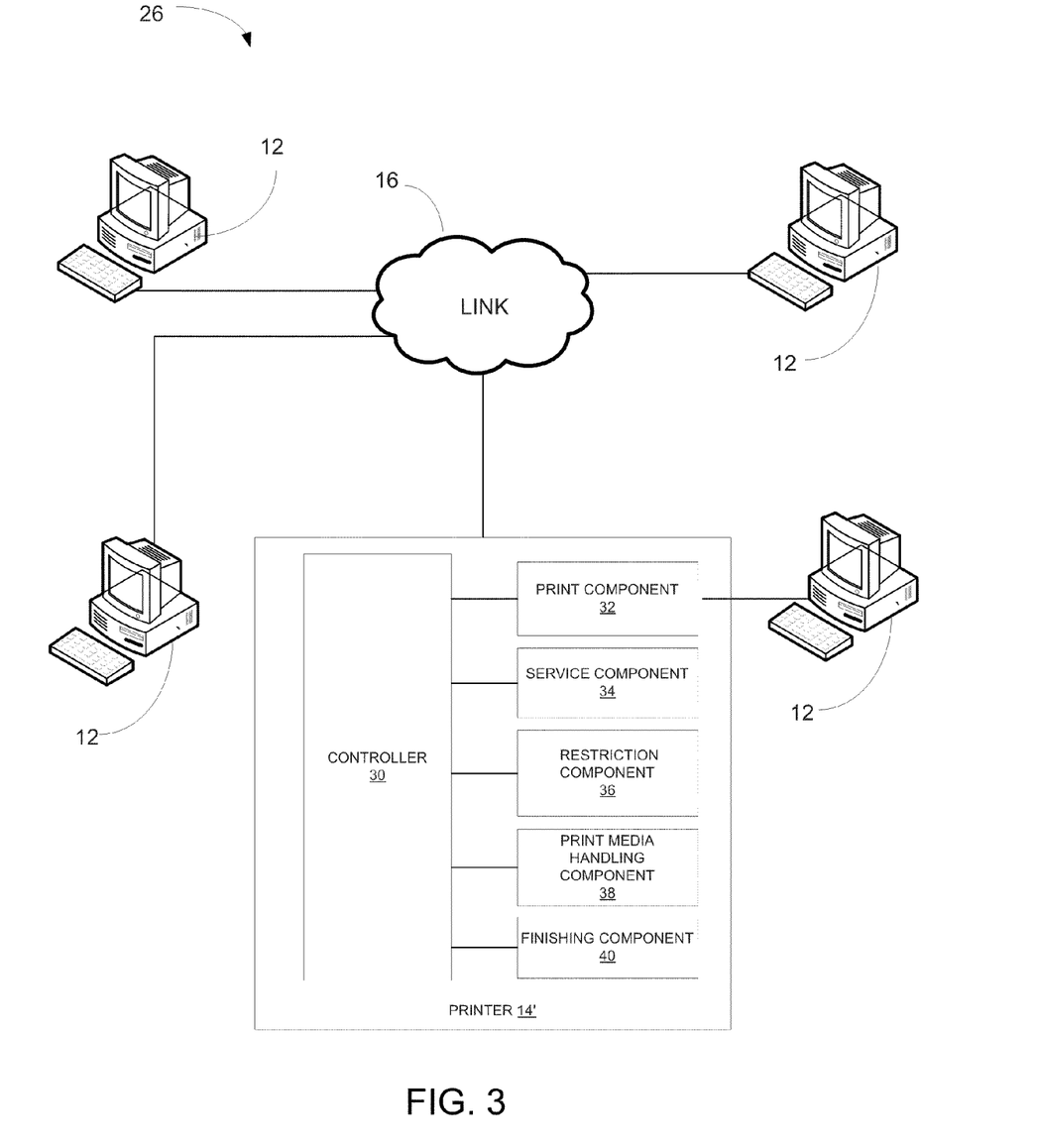
FIG. 3 depicts an implementation of the print media source restrictor of FIG. 2 according to an embodiment.

Print media source restrictor 18 may be implemented in a number of environments such as environment 26 of FIG. 3. Environment 26 includes workstations 12, and a printer 14' that interconnects with workstations 12 via the link 16, and/or connects directly to workstations 12 via a cable or wireless or other means, without connecting the link 16. In one embodiment the printer 14' connects to the link 16 in a manner such that printer 14' may receive instructions and print jobs from workstations 12 via the link 16. In another embodiment, the printer 14' may connect directly to one or more workstations 12 via a cable or wireless or other means, without connecting the link 16.

Printer 14' of FIG. 3 includes a print component 32, a service component 34, a restriction component 36, a print media handling component 38, a finishing component 40, and a controller 30. Print component 32 represents generally any combination of elements capable of being utilized to form desired images on print media. Print media may include sheets, a continuous roll or web, or any other print media on which a print image can be formed. In a given example, print component 32 may include a print head configured to dispense ink. In another example, print component 32 may be configured to fuse toner to print media. Service component 34 represents generally any combination of elements capable of being utilized to service print component 32. Where, for example, print component 32 includes a print head, service component 34 may be configured to function as a spittoon, pen wiper, and color and alignment calibrator.

Restriction component 36 represents generally any programming that, when executed, implements the functionality of print media source restrictor 18 of FIG. 2. In particular, restriction component 36, when executed by controller 30, is responsible for presenting to a first user of a printer 14' that is configured to access a plurality of print media sources an option to restrict printing to a first print media source. The restriction component 36 receives from the first user an instruction to restrict printing to the first print media source. The restriction component 36 may also receive from the first user or a second user an instruction to unrestrict printing to the first print media source. The restriction component 36 restricts printing to the first print media source. In doing so, the restriction component 36 may cause the printer 14' to print to the first print media source if an instruction to print specifically designates the first print media source for printing. The restriction component 36 may also unrestrict the printer to make the first print media source available for printing. The restriction component 36 may incorporate a sensing device 28, which sensing device 28 is configured to interpret a marking on the first print media source that is the instruction to restrict or to unrestrict printing to the first print media source. The restriction component 36 may also incorporate a marking device 26, which marking device 26 is operable to mark the first print media source with the instruction to restrict or to unrestrict printing to the first print media source.

Print media handling component 38 represents generally any combination of hardware and programming capable of transporting print media through the printer 14'. Finishing component 40 represents generally any combination of hardware and programming capable of performing a finishing operation on print media. Such finishing operations include cutting, folding, laminating or any other action that affects the physical nature of the print medium.

Printer 14' is shown to include a controller 30. As used in this specification, controller 30 represents generally any combination of elements capable of coordinating the operation of components 32 to 40. In a given implementation, the controller 30 includes a processor and a memory. The processor may represent multiple processors, and the memory may represent multiple memories. In an embodiment, the controller may include a number of software components that are stored in a computer-readable medium, such as memory, and are executable by processor. In this respect, the term "executable" includes a program file that is in a form that can be directly (e.g. machine code) or indirectly (e.g. source code that is to be compiled) performed by the processor. An executable program may be stored in any portion or component of memory.

Operation

Figure 4:
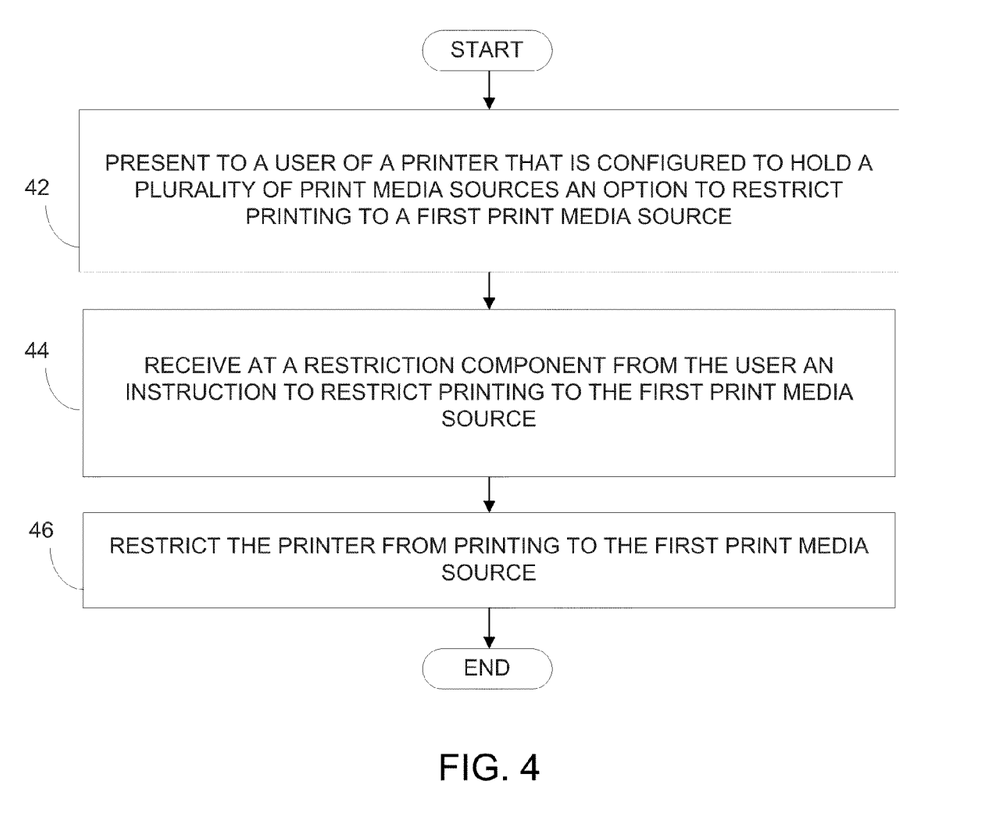
FIGS. 4-5 are exemplary flow diagrams depicting embodiments of a method to restrict printing to a print media source.
Figure 5:
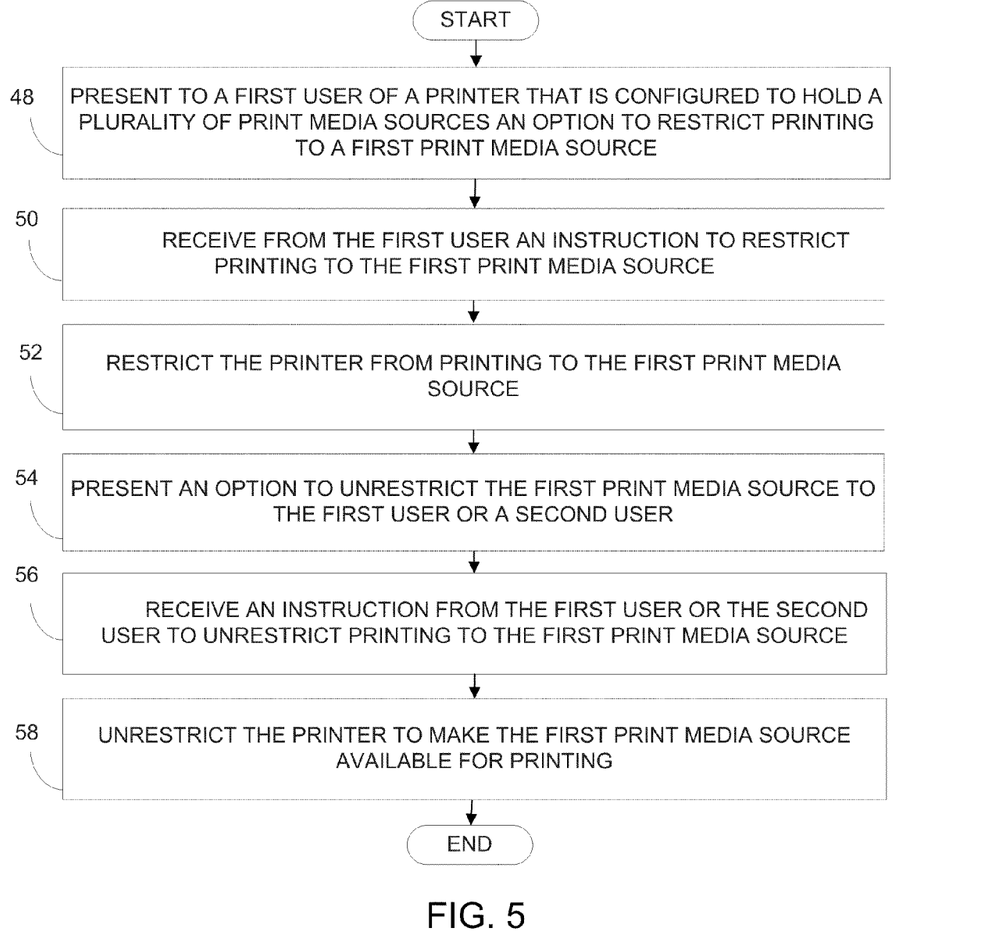
Figure 6:
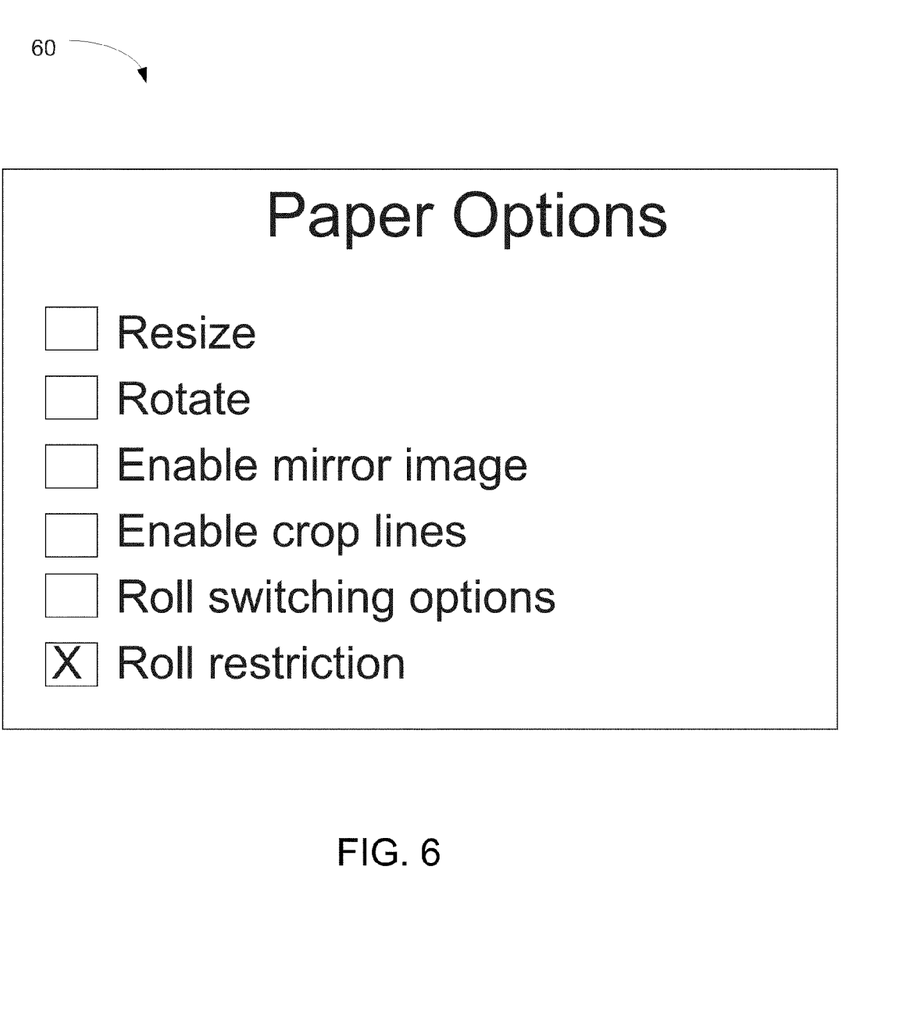
FIGS. 6-7 depict screen shots of user interfaces, according to embodiments.

FIGS. 4-6 are exemplary flow diagrams depicting exemplary embodiments of a method to restrict printing to a print media source. In discussing FIGS. 4-6, reference may be made to the diagrams of FIGS. 1-3 to provide contextual examples. Implementation, however, is not limited to those examples.

Starting with FIG. 4, an option to restrict printing to a first print media source is presented to a user of a printer that is configured to access a plurality of print media sources (block 42). Referring back to FIG. 2, option engine 20 may be responsible for implementing block 42. In an embodiment, the option to restrict printing includes an option to cause the printer to prohibit all printing to the first print media source. In an embodiment, the option to restrict printing includes an option to cause the printer to print to the first print media source if an instruction to print specifically designates the first print media source for printing. In the absence of such a specific designation, the printer would not print to the first print media source. In an embodiment, the user is an administrator that has rights to change printer settings that exceed the rights of other users. In an embodiment, the user may be any user.

Continuing with the flow diagram of FIG. 4, an instruction to restrict printing to the first print media source is received (block 44). Referring back to FIG. 2, instruction engine 22 may be responsible for implementing block 44. Continuing with the flow diagram of FIG. 4, the printer is restricted from printing to the first print media source (block 46). Referring back to FIG. 2, restriction engine 24 may be responsible for implementing block 46. In an embodiment restricting the printer may include prohibiting all printing to the first print media source. In an embodiment restricting printing may include prohibiting printing to the first print media source unless an instruction to print is received that specifically designates the first print media source for printing. In the absence of such a specific designation, the printer would not print to the first print media source. In an embodiment, when a "Roll 1" is restricted and a print job is received with no specific printer designation from the user, the printer will print to a print media source other than Roll 1 based on a source-switching policy. In another embodiment, when Roll 1 is restricted and a print job is received the printer will present the user with an error message stating that the printing to the first print media source has been restricted and that printing will not occur unless the user unrestricts printing to the first print media source or chooses an alternative print media source.

Moving on to FIG. 5, in a particular implementation, an option to restrict printing to a first print media source is presented to a first user of a printer that is configured to access a plurality of print media sources (block 48). Referring back to FIG. 2, the option engine 22 may be responsible for implementing block 48. In an embodiment, the user may be invited to restrict printing to the first print media source during a loading or an unloading operation. As used in this specification and the appended claims, a "loading operation" includes an operation in which a user loads or reloads a print media source, e.g. a print media roll or a source of cut print media, into the printer. As used in this specification and the appended claims, an "unloading operation" includes an operation in which a user removes a print media source, e.g. a print media roll or a source of cut print media, from the printer.

Continuing with the flow diagram of FIG. 5, an instruction to restrict printing to the first print media source is received (block 50). Referring back to FIG. 2, the instruction engine 22 may be responsible for implementing block 50. The printer is restricted from printing to the first print media source (block 52). Referring back to FIG. 2, the restriction engine 24 may be responsible for implementing block 52. In an embodiment, restricting printing may include prohibiting printing to the first print media source unless an instruction to print is received that specifically designates the first print media source for printing.

Continuing with the flow diagram of FIG. 5, an option to unrestrict printing to the first print media source is presented to the first user or a second user (block 54). Referring back to FIG. 2, the option engine 20 may be responsible for implementing block 54. In an embodiment, the first user is an administrator that has rights to change printer settings that exceed the rights of a regular user. In an embodiment, both the first and second users are general users that do not have administrative rights. In an embodiment, the first user that has administrative rights is invited to unrestrict printing to the first print media source during a loading or an unloading operation. In an embodiment, any user that is performing a loading or an unloading operation is invited to unrestrict printing to the first print media source. In an embodiment the option to unrestrict printing to the first print media source may be presented to users other than the first user that restricted the print media source.

Continuing with the flow diagram of FIG. 5, an instruction to unrestrict printing to the first print media source is received from the first user or a second user (block 56). Referring back to FIG. 2, the instruction engine 22 may be responsible for implementing block 56. In an embodiment the instruction to unrestrict printing to the first print media source the first print media source may be received from the first user that restricted the first print media source. In an embodiment the instruction to unrestrict printing to the first print media source may be received from users other than the first user that restricted the print media source. In an embodiment, the instruction to unrestrict printing to the first print media source the first print media source may be received from any user. Continuing with the flow diagram of FIG. 5, the printer is unrestricted to make the first print media source available for printing (block 58). Referring back to FIG. 2, the restriction engine 24 may be responsible for implementing block 58.

In an embodiment, the first print media source may be marked as restricted or unrestricted, as applicable, upon receipt of an instruction to restrict printing or unrestrict printing to a first print media source. As used in this specification and the appended claims, "marked as restricted" includes any marking that communicates that printing to the media is restricted or protected. Specific words such as "restricted" or "protected" are not required. As used in this specification and the appended claims, "marked as unrestricted" includes any marking that communicates that printing to the media is unrestricted, not restricted or not protected. Specific words such as "unrestricted" or "not protected" are not required. Referring back to FIG. 2, the marking device 26 may be utilized during marking. In an embodiment, the marking may be a bar code that, when read by a sensing device, conveys that printing to the print media source has been restricted or unrestricted, as applicable. In an example, a media roll may be marked with a bar code that can be read by a sensing device each time the printing device is powered up to determine whether printing to the print media source has been restricted or unrestricted. In an embodiment, the marking may be the setting of an electromagnetic switch on the first print media source to indicate that printing to the print media source has been restricted or unrestricted, as applicable.

In an embodiment the marking on the first print media source is read. In an embodiment the marking is read upon installation or reinstallation of the first print media source into the printer. Referring back to FIG. 2, a sensing device 28 that electronically connects to a restriction engine may be utilized in reading the marking. In an example, an optical sensor may be used to read a bar code that conveys that printing to a print media source has been restricted. In this example, the printer is restricted from printing to the first print media source upon a determination that the first print media source is marked as restricted. In an example, a first print media source may be read by utilizing a sensor to detect the position of an electromagnetic switch on the first print media source, the position of the switch conveying that printing to a print media source has been unrestricted. In this example, the printer is unrestricted to make the first print media source available for printing upon a determination that the first print media source is marked as unrestricted.

Example

Figure 7:
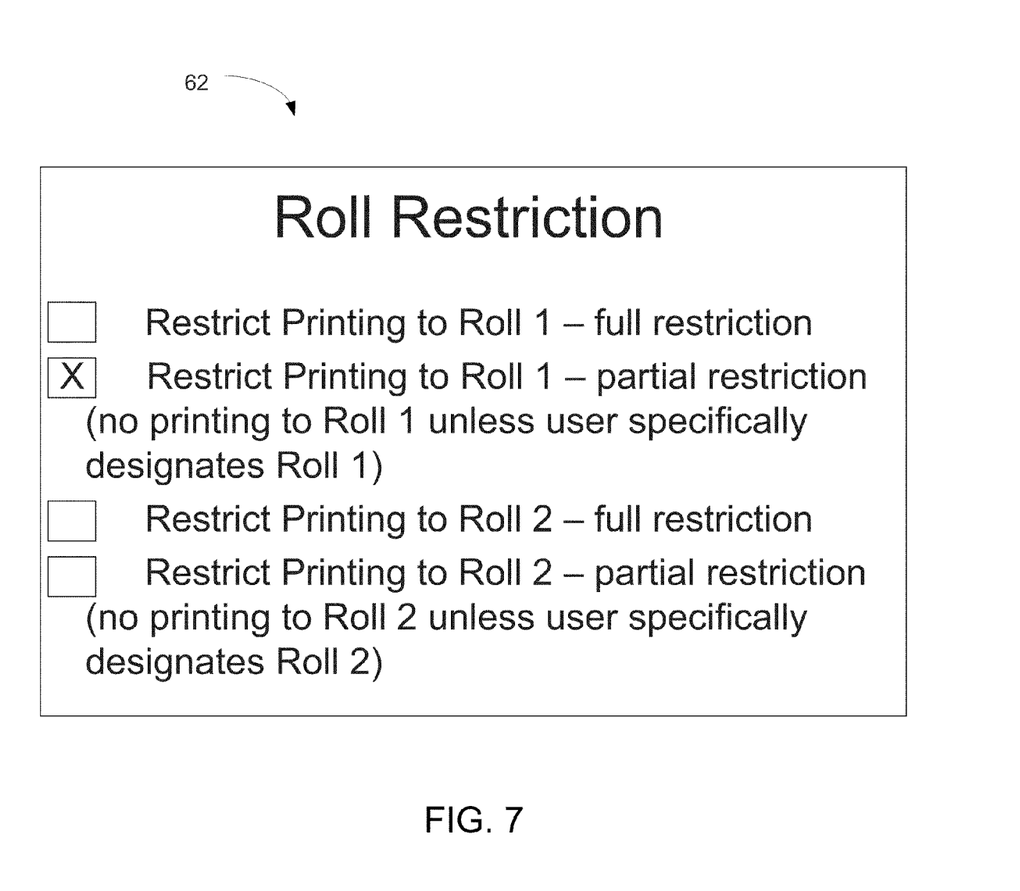

FIGS. 6-7 depict screen shots of a user interfaces, according to embodiments. FIG. 6 is a screen shot of a first user interface 60 that, in an embodiment, may be presented to a user of a printer that is configured to access a plurality of print media sources. In an embodiment the first user interface 60 may be presented to the first user as an option in a print driver. In an embodiment the user interface 60 may be presented to the first user via a printer's interactive display screen. In an embodiment the user interface 60 may be presented to the first user as a splash screen during a loading or unloading operation. In this example, the first user interface 60 presents the user with the option to restrict printing to a print media roll as one of several paper options.

FIG. 7 is a screen shot of a second user interface 62 that, in an embodiment, may be presented to a user of a printer that is configured to access a plurality of print media sources after the first user interface. In an embodiment, the second user interface may be presented to a user in the same manners as the first user interface (e.g. via a print driver, interactive screen display, or spashscreen). In this example, the second user interface 62 presents the user with several restriction options. The user may choose to fully restrict printing to Roll 1. The user may choose to partially restrict printing to Roll 1 (no printing to Roll 1 unless the user specifically designates Roll 1 when sending the print job). In this example, the user may choose to totally restrict printing to Roll 2 or to partially restrict printing to Roll 2. In an embodiment, the user may be given the option to restrict Roll 1 or Roll 2, but not both.

CONCLUSION

The diagram of FIG. 1 is used to depict an exemplary environment in which various embodiments may be implemented. Implementation, however, is not so limited. FIGS. 2-3 show the architecture, functionality, and operation of various embodiments. Various components illustrated in FIGS. 2-3 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present disclosure may be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 4-5 show specific orders of execution, the order of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method, comprising:
   presenting, during a loading or unloading operation, to a first user of a printer that is configured to access a plurality of print media sources an option to restrict utilization of a first print media source;
   receiving from the first user an instruction to restrict utilization of the first print media source; and
   restricting the printer from utilizing the first print media source.

2. The method of claim 1, wherein restricting the printer from utilizing the first print media source comprises causing the printer to utilize the first print media source only if an instruction to print specifically designates the first print media source for printing.

3. The method of claim 1, further comprising:
   presenting to the first user an option to unrestrict utilization of the first print media source;
   receiving from the first user an instruction to unrestrict utilization of the first print media source; and
   unrestricting the printer to make the first print media source available for printing.

4. The method of claim 1, further comprising:
   presenting to the first user or a second user an option to unrestrict utilization of the first print media source;
   receiving from the first user or the second user an instruction to unrestrict utilization of the first print media source; and
   unrestricting the printer to make the first print media source available for printing.

5. The method of claim 4, wherein presenting to the first user or the second user an option to unrestrict utilization of a first print media source comprises inviting the first user or the second user to unrestrict utilization of the first print media source during a loading or unloading operation.

6. The method of claim 4, further comprising:
   marking the first print media source as restricted or unrestricted; and
   reading the marking on the first print media source;
   in which:
      restricting comprises restricting the printer from utilizing the first print media source upon a determination that the first print media source is marked as restricted; and unrestricting comprises unrestricting the printer to make the first print media source available upon a determination that the first print media source is marked as unrestricted.

7. The method of claim 4, further comprising:
marking the first print media source as restricted or unrestricted; and
reading the marking on the first print media source upon installation or reinstallation of the first print media source into the printer;
in which:
restricting comprises restricting the printer from utilizing the first print media source upon a determination that the first print media source is marked as restricted; and
unrestricting comprises unrestricting the printer to make the first print media source available upon a determination that the first print media source is marked as unrestricted.

8. A non-transitory computer readable medium storing computer executable instructions that when executed implement a method to restrict printing to a print media source, the method comprising:
presenting, during a loading or unloading operation, to a user of a printer that is configured to access a plurality of print media sources, an option to restrict utilization of a first print media source;
receiving from the user an instruction to restrict utilization of the first print media source; and
restricting the printer from utilizing the first print media source;
presenting to the user an option to unrestrict utilization of the first print media source;
receiving from the user an instruction to unrestrict utilization of the first print media source; and
unrestricting the printer to make the first print media source available for printing,
in which presenting to the user an option to unrestrict utilization of a first print media source comprises inviting the user to unrestrict utilization of the first print media source during a loading or unloading operation.

9. The medium of claim 8, wherein restricting the printer from utilizing the first print media source comprises causing the printer to utilize the first print media source only if an instruction to print specifically designates the first print media source for printing.

10. The medium of claim 8, wherein the user is a first user, and further comprising:
presenting to the first user or a second user an option to unrestrict utilization of the first print media source;
receiving from the first user or the second user an instruction to unrestrict utilization of the first print media source; and
unrestricting the printer to make the first print media source available for printing.

11. The medium of claim 8, further comprising
marking the first print media source as restricted or unrestricted;
reading the marking on the first print media source;
in which restricting comprises restricting the printer from utilizing the first print media source upon a determination that the first print media source is marked as restricted; and
unrestricting comprises unrestricting the printer to make the first print media source available upon a determination that the first print media source is marked as unrestricted.

12. The medium of claim 11, in which the marking is a bar code that, when read by a sensing device, conveys a restricted status of printing to the print media source.

13. The medium of claim 11, in which the marking is read upon installation of the first print media source into the printer.

14. The medium of claim 11, in which the first print media source is marked as restricted or unrestricted upon receipt of an instruction to restrict printing.

15. The medium of claim 8, further comprising:
marking the first print media source as restricted or unrestricted;
reading the marking on the first print media source upon installation or reinstallation of the first print media source into the printer;
in which:
restricting comprises restricting the printer from utilizing the first print media source upon a determination that the first print media source is marked as restricted; and
unrestricting comprises unrestricting the printer to make the first print media source available upon a determination that the first print media source is marked as unrestricted.

16. A system, comprising:
an option engine to present, during a loading or unloading operation, to a first user of a printer that is configured to access a plurality of print media sources an option to change the restricted state for utilization of a first print media source;
an instruction engine to receive from the first user an instruction to change the restricted state for utilization of the first print media source;
a restriction engine to restrict or unrestrict the printer from utilizing the first print media source based on the instructions received from the instruction engine; and
a marking device, electronically connected to the instruction engine, to mark the first print media source with a marking that indicates a restricted state for utilization of the first print media source.

17. The system of claim 16, wherein the restriction engine restricts the printer from printing to the first print media source by causing the printer to utilize the first print media source only if an instruction to print specifically designates the first print media source for printing.

18. The system of claim 16,
wherein, the instruction engine further receives from the first user an instruction to unrestrict utilization of the first print media source; and
wherein the restriction engine further unrestricts the printer to make the first print media source available for printing.

19. The system of claim 16,
wherein, the instruction engine further receives from the first user or a second user an instruction to unrestrict utilization of the first print media source; and
wherein the restriction engine further unrestricts the printer to make the first print media source available for printing.

20. The system of claim 19, further comprising:
a sensing device, electronically connecting to the restriction engine, to interpret a marking on the first print media source that is the instruction to restrict utilization of the first print media source or the instruction to unrestrict utilization of the first print media source, and to pass the instruction to restrict or the instruction to unrestrict to the restriction engine.

21. The system of claim 16, further comprising:
a sensing device, electronically connected to the restriction engine, to interpret the marking and to pass the instruction to restrict printing or the instruction to unrestrict printing to the restriction engine.

22. The system of claim 16, in which the marking is an instruction to unrestrict utilization of the first print media source.

23. The system of claim 16, in which the marking is a bar code that, when read by a sensing device, conveys a restricted status of printing to the print media source.

* * * * *